United States Patent [19]

Mason

[11] 4,293,881
[45] * Oct. 6, 1981

[54] SYSTEM FOR PRIORITY TRANSCRIBING OF DICTATION

[75] Inventor: Paul C. Mason, Thomaston, Ga.

[73] Assignee: Lanier Business Products, Inc., Atlanta, Ga.

[*] Notice: The portion of the term of this patent subsequent to Apr. 17, 1996, has been disclaimed.

[21] Appl. No.: 957,910

[22] Filed: Nov. 6, 1978

Related U.S. Application Data

[63] Continuation of Ser. No. 781,357, Mar. 25, 1977, Pat. No. 4,150,261.

[51] Int. Cl.³ .................... G11B 15/04; G11B 15/22
[52] U.S. Cl. .................... 360/60; 360/74.1; 360/90; 226/113; 226/118; 369/27
[58] Field of Search ............... 179/100.1 DR; 360/60, 360/74.1, 90, 137, 62, 71, 13; 226/113, 118

[56] References Cited

U.S. PATENT DOCUMENTS

| | | | |
|---|---|---|---|
| 2,988,604 | 6/1961 | Nye | 179/100.1 DR |
| 2,989,594 | 6/1961 | McKaig | 360/74.1 |
| 3,041,417 | 6/1962 | Stroud | 360/90 |
| 3,393,277 | 7/1968 | Nettleton | 360/74.3 |
| 3,596,818 | 8/1971 | Curtis | 226/118 |
| 3,624,358 | 11/1971 | Bevis | 235/476 |
| 3,766,326 | 10/1973 | Buchholz | 179/100.1 D |
| 3,817,436 | 6/1974 | Matz | 226/118 |
| 4,150,261 | 4/1979 | Mason | 179/100.1 D |

*Primary Examiner*—Alan Faber
*Attorney, Agent, or Firm*—Jones, Thomas & Askew

[57] ABSTRACT

A method and system for priority transcribing of a particular unit of dictation in a dictation-transcription system in which units of dictated material may be simultaneously recorded on, and transcribed from, a single continuous recording medium. The portion of the continuous recording medium from which dictated material has been transcribed is transferred to one of a plurality of bins or to one of a plurality of locations within a single bin from which it is withdrawn to be used for the recording of subsequent dictated material, and the system and method disclosed allows a priority unit of dictation in the sequence of units of dictation recorded on the recording medium to be selected from among other units of dictation in the sequence for transcribing without making any untranscribed unit of dictation in the sequence available for the recording of additional dictation which would obliterate any such untranscribed units of dictation. The system includes means for forming a zone into which a portion of the recording medium carrying untranscribed dictated material may be placed while a particular unit of the dictation is being transcribed and from which said portion of the recording medium can be withdrawn only for the transcribing of the untranscribed dictated material.

9 Claims, 4 Drawing Figures

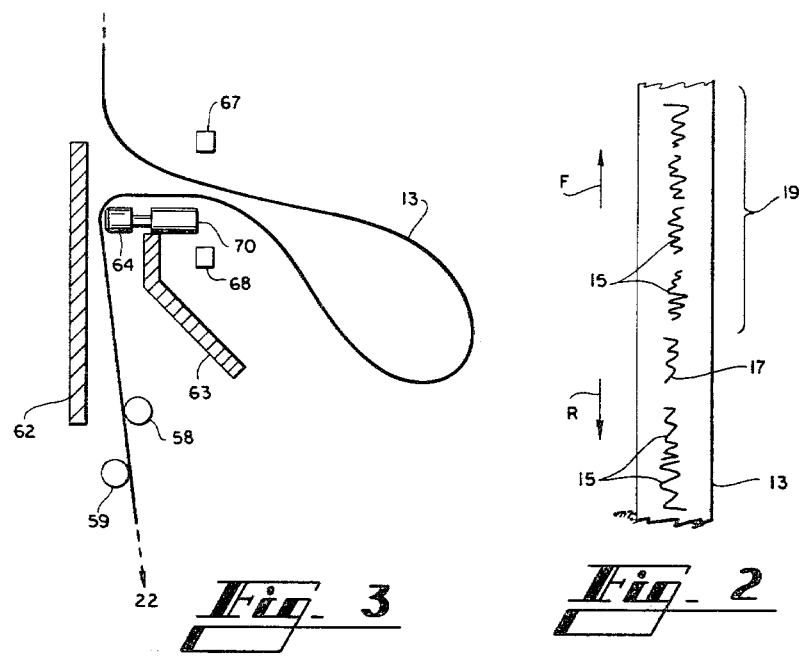
Fig. 3
Fig. 2
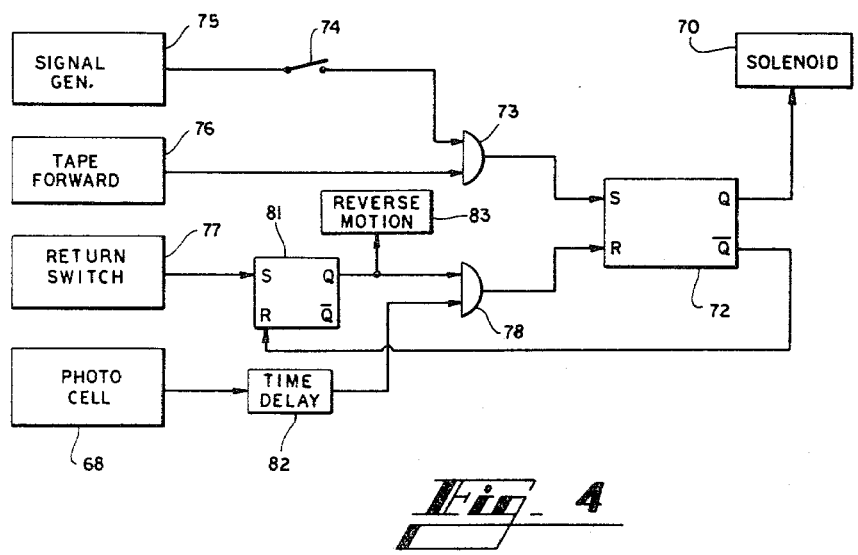
Fig. 4

SYSTEM FOR PRIORITY TRANSCRIBING OF DICTATION

This is a continuation, of application Ser. No. 781,357, filed Mar. 25, 1977, now U.S. Pat. No. 4,150,261.

BACKGROUND OF THE INVENTION

1. Field of the Invention

This invention relates to a method of and a system for transcribing dictated material recorded on a continuous recording medium and, more particularly, to a method of and a system for transcribing dictated material from a continuous recording medium such as tape which is transferred from a first location or zone to a second location or zone as dictated material is transcribed from the recording medium and which is then transferred from the second location or zone to be reused for the recording of dictated material.

2. Discussion of the Prior Art

Dictation-transcription systems in which a continuous recording medium such as tape is transferred from a first location or zone to a second location or zone as dictated material is recorded on the recording medium and in which the medium is transferred from the second location or zone to the first location or zone as the dictated material is transcribed from the recording medium are well-known in the prior art. For example, U.S. Pat. No. 3,024,320 issued on Mar. 6, 1972 and U.S. Pat. No. 3,467,791 issued on Sept. 16, 1969 each disclose a dictation-transcription system in which a continuous tape is transferred from a first bin to a second bin as dictated material is recorded thereon, and transferred from the second bin back to the first bin as the dictated material is transcribed. Similarly, U.S. Pat. No. 3,596,818 issued Aug. 3, 1971 discloses a dictation-transcription system in which a continuous tape is transferred from a first zone to a second zone within a single bin as dictated material is recorded thereon, and transferred from the second zone to the first zone within the same bin as dictated material is transcribed from the continuous tape.

In prior art dictation-transcription systems of the type disclosed in the aforementioned patents, units of dictated material are recorded on the continuous tape in sequence and the units of dictation become available for transcribing in the same sequence. However, most of these prior art dictation-transcription systems have a fast forward control which will enable the continuous tape to be transferred past the transcribing station at a relatively high rate of speed so that a particular priority unit of dictation recorded on the continuous tape may be located and transcribed prior to the transcribing of other units of dictation.

The problem encountered with these prior art dictation-transcription systems when it is desired to transcribe a particular unit of dictation from among other units of dictation on a priority basis is that a substantial portion of the continuous tape carrying dictated material which has not yet been transcribed may have been transferred into the location or zone from which it is withdrawn for the recording of new dictation. Thus, dictated material which has not yet been transcribed at the transcribing station may be obliterated by newly dictated material if it has been transferred to the pre-dictation zone in order to reach a later unit in the sequence for priority transcribing.

SUMMARY OF THE INVENTION

The invention disclosed herein overcomes this and other problems encountered in priority transcription of a particular unit of dictation using prior art dictation-transcription systems in which dictated material is recorded on and transcribed from a continuous recording medium such as tape by retaining all portions of the recording medium carrying untranscribed units of dictated material either prior to or following the priority unit either in the zone or location from which it is customarily drawn for transcribing or in a retaining zone from which it can be drawn only for transfer back into the zone from which it is customarily drawn for transcribing, whereby no portion of the recording medium carrying dictated material which has not been transcribed can be inadvertently used for the recording of additional dictated material.

Broadly stated, when embodied in a dictation-transcription system wherein units of dictation are recorded in sequence on a recording medium as the recording medium is moved in a first direction relative to a transcribe location and subsequently is moved along a path of motion extending into a holding location from which said recording medium is withdrawn for recording additional units of dictation on said recording medium, the invention includes means for diverting said recording medium from said path of motion into a retaining location as said medium is moved in the first direction relative to said transcribe location, means for positioning a selected unit of dictation recorded on said recording medium for transcribing at said transcribe location, and means for moving said recording medium from said retaining location to said holding location by motion of said recording medium in a second direction relative to said transcribe location and by subsequent motion of said recording medium in said first direction relative to said transcribe location.

The diverting means is selectively operative when it is desired to transcribe a particular unit of dictation in the sequence recorded on the recording medium which has not yet reached the transcribing station by advancing the recording medium past the transcribing station without transcribing other units of dictation until the particular unit of dictation is reached. Once the particular unit of dictation which it is desired to transcribe on a priority basis has been reached at the transcribing station and the entire preceding portion of the recording medium carrying dictated material which has not been transcribed has been diverted into the retaining zone by the diverting means, the medium is retained until the particular unit of dictation has been transcribed. Thereafter the portion of the recording medium in the retaining zone is removed from the retaining zone by moving the recording medium in a reverse direction to return the recording medium to its original position relative to the transcribing station. When the retaining zone has been emptied, the diverting means may be rendered inoperative in response to a concurrence of the absence of recording medium in the retaining zone and the operation of a control which begins the transcribing of units of dictation in the recorded sequence.

When embodied in a method of transcribing dictated material, the invention includes the steps of discontinuing the transcribing of dictated material, drawing a recording medium carrying a sequence of units of dictated material past a transcribing station until a particular unit of dictation is reached on the recording medium, diverting any portion of the recording medium containing dictated material which was not transcribed as the recording medium passed the transcribing station into a retaining zone, retaining said portion of the recording medium in the retaining zone until the transcribing of the particular unit of dictation is completed, and returning the retained portion of the recording medium from the retaining zone past the transcribe station in a reverse direction to make the first unit of dictation which was not transcribed available for transcribing.

The invention may be embodied as apparatus or method with respect to either dictation-transcription systems which transfer a continuous recording medium between a plurality of bins in connection within the recording and transcribing of dictated material or dictation-transcription systems which transfer a continuous recording medium between a plurality of zones within a single bin in connection with the recording and transcribing of dictated material. However, regardless of the type of dictation-transcription system in which the invention is embodied as an apparatus or method, the invention enables a particular unit of dictated material to be transcribed out of recorded sequence without allowing units of dictation prior to the particular unit in the recorded sequence to be obliterated by the recording of new dictated material.

BRIEF DESCRIPTION OF THE DRAWING

These and other features and advantages of the invention will be clearly understood from the following detailed description and the accompanying drawing in which:

FIG. 2 is a schematic representation of a portion of a continuous tape carrying a sequence of units of dictation recorded thereon.

FIG. 3 is a schematic representation of the diverting means and retaining zone of the dictation-transcription system of FIG. 1.

FIG. 4 is a schematic representation of a control means for the diverting means in the embodiment of the invention shown in FIGS. 1 and 3.

DESCRIPTION OF AN EMBODIMENT

Figure 1:
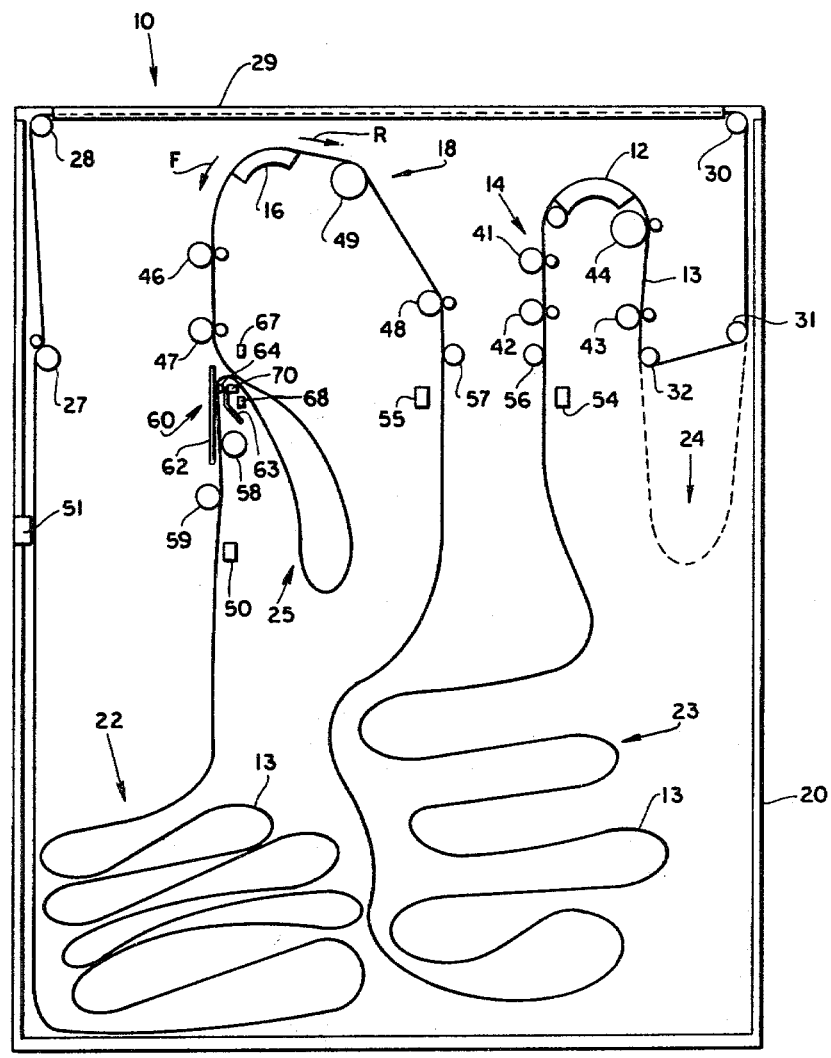
FIG. 1 is a schematic representation of a dictation-transcription system embodying the invention disclosed herein.

Those skilled in the art will recognize the dictation-transcription system shown in FIG. 1 as being generally conventional except for the invention disclosed herein. Thus, it will be understood that the dictation-transcription system 10 shown schematically in FIG. 1 includes a dictate head assembly 12 which may include one or more recording/listening heads for recording and reviewing dictation recorded on a tape 13 as it is moved relative to the dictate head assembly 12 by a transport means 14. Similarly, it will be understood that the dictation-transcription system includes a transcribe head assembly 16 which includes one or more recording/listening heads for listening to dictation recorded on the tape as the tape is moved relative to the transcribe head assembly by a tape transport means 18.

Further, those skilled in the art will recognize from FIG. 1 that the dictation-transcription system selected herein to disclose an embodiment of the invention is a dictation-transcription system having a single bin 20 into which, and from which, the tape transports 14 and 18 move the tape 13 for the recording or transcribing of dictation. As shown in FIG. 2, a sequence of units 15 of dictation are recorded on the tape 13 as the tape 13 is moved past the dictate head assembly 12 in a forward direction (indicated by arrow F) by tape transport 14. Previously recorded units 15 of dictation may be reviewed by the operation of the tape transport 14 to move the tape 13 first in a reverse direction (indicated by arrow R) and then in a forward F direction with the record/listen heads in dictate head assembly 12 in a listen mode. The tape transport 18 similarly moves the tape 13 in forward and reverse directions relative to transcribe head assembly 16 for listening, transcribing and reviewing the units 15 of dictation which are in sequence along tape 13.

The bin 20 has a zone 22 into which the tape 13 passes from the tape transport 18 after dictation on the tape 13 has been transcribed and from which the tape 13 is withdrawn by the tape transport 14 for the recording of dictation. As seen in FIG. 1, the tape transport 14 delivers the tape 13 from the zone 22 to the dictate head assembly 12 by a path which is defined by idler rollers 27 and 28, a channel member 29 and idler rollers 30, 31 and 32. As also shown in FIG. 1, the entire path of travel of the tape in such a dictation-transcription system occurs in a single vertical plane.

In addition, the bin 20 includes a zone 23 into which the tape 13 is delivered by the tape transport 14 after the recording of dictation and from which the tape 13 is withdrawn by the tape transport 18 for the transcribing of dictation. In the particular dictation-system transcription system used herein to disclose an embodiment of the invention, the bin 20 also includes a zone 24 into which the tape 13 is delivered by the tape transport 14 when it is desired to use the dictate head assembly 12 to review and possibly change previously dictated material. Those skilled in the art will understand that the zone 24 is required in the particular dictation-transcription system shown in FIG. 1 because the tape transport 14 cannot push flexible tape 13 back into the zone 22 along the path through channel 29.

It will also be understood from FIG. 1 that the tape transport 14 will generally include various arrangements of pressure rollers, namely, dictate forward drive 41, dictate fast forward drive 42, and dictate reverse drive 43, and a capstan 44 to move the tape 13 in various directions relative to the dictate head assembly 12. Similarly, the tape transport 18 will include various arrangements of pressure rollers, namely, transcribe forward drive 46, transcribe fast forward drive 47, and transcribe reverse drive 48, and a capstan 49 to move the tape 13 in various directions relative to the transcribe head assembly 16. The tape 13 is guided in and out of zone 22 by idler rollers 27, 58 and 59, and in and out of zone 23 by idler rollers 56 and 57.

Accordingly, the dictation-transcription system shown in FIG. 1 as thus far described is a generally conventional dictation-transcription system utilizing a single bin 20. As already indicated above, however, the invention disclosed herein may be embodied not only in a dictation-transcription system having a single bin 20 but also a dictation-transcription system having a plurality of bins. Regardless of the dictation-transcription system in which the invention disclosed herein is embodied, it will be understood by those skilled in the art that whether a dictation-transcription system has a single bin or a plurality of bins, the operation of the tape transport 14 for the recording of dictation on the tape 13 while the tape transport 18 is inoperative will eventually transfer substantially all of the tape 13 from the zone 22 past the dictate head assembly 14 and into the zone 23.

When this occurs, continued operation of the tape transport 14 will either cause the tape 13 to be broken or will cause the tape 13 to be withdrawn from the zone 23 if the tape transport 14 pulls the tape 13 past the transcribe head assembly 18 into the path through channel 29. In order to prevent this from occuring, it is customary to provide some means for rendering the tape transport 14 inoperative when substantially all of the tape 13 has been removed from the zone 22. The means shown in FIG. 1 is a light 50 and photocell 51 such as disclosed in U.S. Pat. No. 3,619,626 issued on Nov. 9, 1971. Those skilled in the art will also understand that a similar light 54 and photocell 55 may be used if it is desired to prevent the tape transport 18 from pulling tape from the zone 23 after substantially all of the tape has been removed from the zone 23.

Since the dictation-transcription system disclosed in FIG. 1 as thus far described is generally conventional, various operating circuits and various other conventional features have not been shown in FIG. 1 or described above. However, at this point it will be understood that units 15 of dictation are recorded in sequence on the tape 13 at the dictate head assembly 12 and reach the transcribe head assembly 16 for transcribing in the same sequence.

Thus, if it is desired to transcribe a unit of dictation such as 17 out of sequence because of some priority situation, it is necessary in a conventional system that the portion 19 of tape 13 containing all units of dictation prior to unit 17 be moved by the tape transport 18 past the transcribe head assembly 16 and into the zone 22. However, in such prior dictation-transcription systems, this untranscribed portion 19 of the tape 13 could be withdrawn from the zone 22 into the path through channel 29 by the tape transport 14. If of sufficient length, some or all the units of dictation on the portion 19 the tape 13 could be obliterated by the recording of new dictation at the dictate head assembly 12. Moreover, once the tape 13 has been drawn by the tape transport 14 past idler roller 27 in the path toward channel 29, it would be impossible for the tape transport 18 to move the tape 13 in the reverse direction R past the transcribe head assembly 16 to allow previously bypassed untranscribed units of dictation 19 to be subsequently transcribed.

In a dictation-transcription system embodying the invention disclosed herein, a diverting means 60 is provided between the transcribe head assembly 16 and the zone 22. In the embodiment of the invention disclosed herein, the diverting means 60 includes plates 62 and 63 between which the tape 13 passes into the zone 22. In addition, the diverting means 60 in the embodiment of the invention disclosed herein is provided by a pressure brake 64 and the upper edge of the plate 63.

As shown in FIG. 3, the pressure brake 64 is movable by a solenoid 70 and is arranged in a conventional manner so that energizing of the solenoid 70 causes the pressure brake 64 to force tape 13 against the plate 62, inhibiting motion of the tape 13 into the zone 22. As seen in FIG. 1, the upper edge of the plate 63 is positioned so that when motion of the tape 13 into the zone 22 is stopped by brake 65, the tape 13 is diverted into a zone 25.

The braking means provided by the plate 62 and the pressure brake 64 is not only sufficient to stop the motion of the tape 13 into a zone 22 but also sufficient to prevent the tape 13 from being withdrawn from the zone 25 into the path through channel 29 by operation of the tape transport 14 when all the tape within zone 22 has been withdrawn by tape transport 14. Thus, it will be understood that the invention disclosed herein not only provides a diverting means for diverting the tape 13 from its path of travel into the zone 22 but also a retaining means which prevents the tape 13 from being withdrawn from the retaining zone 25 by the tape transport 14. Accordingly, when it is desired to transcribe a unit 17 of dictation carried by tape 13 out of sequence, the invention provides a retaining zone 25 in which untranscribed units 19 of dictation may be retained to be subsequently withdrawn by the transcribe reverse drive 48 of the tape transport 18 back toward zone 23 so that said untranscribed units 19 are available for transcribing, but from which the tape 13 cannot be withdrawn by the tape transport 14 and made unavailable for the transcribing of untranscribed units of dictation.

Once the invention disclosed herein is understood from the foregoing description, it will be realized by those skilled in the art that a variety of arrangements may be used to divert a tape 13 into a retaining zone and that the arrangement shown in FIGS. 1 and 3 are merely illustrative of this variety of arrangements. For instance, the diverting means need not divert the tape into a retaining zone in the same plane as the path of travel of the tape as is the case in the embodiment shown in FIGS. 1 and 3. However, it is preferred to divert the tape in said vertical plane because this allows the means for diverting the tape to be uncomplicated and trouble free since the tape is not twisted while being diverted.

It should also be understood that a variety of arrangements may be used to initiate and control the operation of the diverting means 60. An example of appropriate circuitry for controlling the diverting means is shown in FIG. 4, where it will be seen that the solenoid 70 operates in response to a signal from the Q output of flip-flop 72. The set input signal to the flip-flop 72 is provided through an AND gate 73 by signal generator 75 upon the closing of a switch 74 and by the engagement of the tape forward mode 76 of the tape transport 18. Thus, when it is desired to transcribe a unit 17 of dictation out of sequence on the tape 13, the switch 74 is closed and transcribe forward drive 46 or transcribe fast forward drive 47 of the tape transport 18 operated to provide tape forward motion. The resulting Q output of the flip-flop 72 energizes the solenoid 70 so that the portion 19 of the tape 13 passing the transcribe head apparatus 16 is diverted into the retaining zone 25. It will be noted that the dictated material passing the transcribe head assembly 16 is not thereby removed from the tape 13.

Upon the completion of transcription of the priority unit 17 of dictation, a return switch 77 is operated to provide a signal to the set input of a flip-flop 81, which will then provide a Q output to cause tape transport 18 to provide reverse motion of said tape 13 in the R direction relative to said transcribe head assembly 16, represented in FIG. 4 as reverse motion mode 83. The operation of the reverse motion mode 83 draws the tape 13 out of the retaining zone 25 until there is no tape between a photocell 68 and a light 67. The photocell 68 then provides an output signal which is delayed for a short period of time, for example 1–2 seconds, by a delay circuit 82, and which thereafter provides a necessary input signal to an AND gate 78. The other required input to the AND gate 78 is provided by the Q output of flip-flop 81, so that the AND gate 78 provides an output to reset flip-flop 72, thereby de-energizing solenoid 70 and thereby releasing brake 64. The −Q output of reset flip-flop 72 also resets flip-flop 81, thereby terminating the reverse motion of the tape 13 which has now reached its former position relative to transcribe head assembly 16 so that the untranscribed portion 19 of the sequence of units recorded on tape 13 may be transcribed.

Thus, it will be understood that upon completion of transcription of the priority unit of dictation 17, when the transcriptionist momentarily operates return switch 77, the tape 13 within the retaining zone 25 will be removed and drawn in a reverse direction relative to transcribe head assembly 16 only until the zone 25 is emptied of tape 13. The time delay circuit 82 assures that all of the tape 13 will be drawn out of the zone 25 by allowing the reverse motion mode 83 to remain operative after no tape is present between the light 67 and the photocell 68 until the loop of tape extending toward zone 25 and still existing after the tape clears the path between light 67 and photocell 68 is eliminated. As a result of the time delay circuit 82, the tape 13 will not re-enter the retaining zone 25 when normal transcribing of dictation is resumed after the transcribing of a priority unit of dictation in the manner described above, but will enter the zone 22.

It will be further understood that the solenoid 70 remains energized during the operation of the reverse motion mode 83 in order to press brake 64 against plate 62 to prevent the tape 13 from being inadvertently drawn from the retaining zone 25 into the zone 22 by the weight of the tape in zone 22 or by the operation of tape transport 14 as described above. The invention disclosed herein not only retains the tape 13 in a retaining zone 25 but also releases the tape to be movable into zone 22 by the tape transport 18 in a forward mode, and to be movable along the path through channel 29 after all of the tape has been removed from the retaining zone 25 by the tape transport 18 in a reverse mode.

While this invention has been described in detail with reference to a preferred embodiment thereof, it will be understood that variations and modifications can be effected within the spirit and scope of the invention as described hereinbefore and as defined in the appended claims.

What is claimed is:

1. In an apparatus for simultaneously recording and transcribing dictated material on a continuous recording medium, including a dictation station for recording units of dictation in sequence on said medium, a transcribing station for transcribing units of dictation recorded on said medium, a first medium storage zone holding portions of said medium ready for dictation to be recorded thereon, a second medium storage zone holding portions of said medium having units of dictation ready to be transcribed recorded thereon, dictate motion means for moving said medium relative to said dictation station from one of said first and second zones toward the other of said first and second zones, and transcribe motion means for moving said medium relative to said transcribing station from one of said first and second zones to the other of said first and second zones, the improvement wherein said apparatus further comprises:

means for diverting an untranscribed portion of said medium from its path of travel from said transcription station to said first zone into a third zone until a selected unit of dictation in the sequence carried by said medium reaches said transcribing station, said diverting means comprising braking means between said transcribing station and said first zone for arresting the depositing of said medium into said first zone by said transcribe motion means and guiding means for guiding said medium still being moved by said transcribe motion means and having untranscribed units of dictation recorded thereon into said third zone; and means for returning said untranscribed portion following transcription of said selected unit of dictation by said transcribing station from said third zone to a position from which said untranscribed portion subsequently may be drawn by said transcribe motion means through said transcribing station and transcribed.

2. The apparatus of claim 1 wherein said medium travels in a path defining a single vertical plane; and wherein said diverting means comprises means for diverting said medium solely within the vertical plane defined by the path of travel of the medium.

3. The apparatus of claim 1 wherein said diverting means includes:
a guide plate along the path of said medium into said first zone between said transcribing station and said first zone;
a brake adjacent said guide plate;
brake control means selectively operable to press said brake against said guide plate and grasp said medium therebetween to arrest the motion of said medium from said transcribing station into said first zone; and
means for guiding said medium into said third zone when said brake is engaged.

4. The apparatus of claim 3 further comprising
means for sensing the presence of medium in said third zone; and
means for rendering said brake control means inoperative and disengaging said brake when said returning means has emptied said third zone of said medium.

5. The apparatus of claim 1 wherein said diverting means is between said transcribing station and said first zone; and said returning means comprises said transcribe motion means.

6. The apparatus of claim 1 further comprising:
means for sensing the presence of medium in said third zone; and
means for preventing the depositing of medium into said first zone while medium is present in said third zone.

7. In a recording system having a transcribe location at which units of dictation recorded in sequence on a recording medium are transcribed as said recording medium is moved in a first direction relative to said transcribe location and subsequently is moved in said first direction along a path of motion extending from said transcribe location into a holding location within said recording system from which said recording medium is withdrawn for the recording of additional units of dictation:
selectively operative diverting means for diverting said recording medium from said path of motion into a retaining location discrete from said holding location within said recording system as said recording medium is moved in said first direction relative to said transcribe location, said retaining location being located between said transcribe location and said holding location; and means responsive to presence of recording medium in said retaining location for preventing said recording medium in said retaining location from being removed from said retaining location by motion of said recording medium in said first direction.

8. The apparatus of claim 7, wherein said means for preventing said recording medium from being removed from said retaining location in said first direction does not prevent withdrawal of recording medium from said holding location for recording of additional units of dictation.

9. In a dictation-transcription system including a transcribe location and wherein units of dictation recorded in sequence on a recording medium are transcribed as the recording medium is moved in a first direction relative to said transcribe location and subsequently is moved in said first direction along a path of motion extending from said transcribe station into a holding location from which said recording medium is withdrawn for recording additional units of dictation on said recording medium, the improvement comprising:

means for selectively diverting said recording medium from said path of motion into a retaining location discrete from said holding location as said medium is moved in the first direction relative to said transcribe location;

means for positioning a selected unit of dictation recorded on said recording medium for transcribing at said transcribe location; and means for moving said recording medium from said retaining location to said holding location by motion of said recording medium in a second direction along said path of motion relative to said transcribe location until no recording medium remains in said retaining location and by subsequent motion of said recording medium in said first direction along said path of motion relative to said transcribe location.

* * * * *